(12) United States Patent
Li et al.

(10) Patent No.: US 6,222,944 B1
(45) Date of Patent: Apr. 24, 2001

(54) DOWN-SAMPLING MPEG IMAGE DECODER

(75) Inventors: Shipeng Li; Keren Hu, both of Princeton, NJ (US)

(73) Assignees: Sarnoff Corporation, Princeton, NJ (US); Motorola, Inc., Schaumburg, IL (US)

(*) Notice: Subject to any disclaimer, the term of this patent is extended or adjusted under 35 U.S.C. 154(b) by 0 days.

(21) Appl. No.: 09/286,972

(22) Filed: Apr. 6, 1999

Related U.S. Application Data
(60) Provisional application No. 60/084,632, filed on May 7, 1998.

(51) Int. Cl.[7] .................................................. G06K 9/36
(52) U.S. Cl. ................... 382/250; 382/251; 382/233; 375/240.03; 375/240.16; 375/240.2; 375/240.25
(58) Field of Search .................................. 382/250, 251, 382/233, 248, 232; 348/403, 404, 395, 390, 403.1–404.1, 390.1, 395.1; 358/426, 432; 375/240, 240.01, 240.03, 240.2, 240.25, 240.16, 240.21, 240.18, 240.11–240.12

(56) References Cited

U.S. PATENT DOCUMENTS

| 4,825,285 | * | 4/1989 | Speidel et al. | 348/401 |
|---|---|---|---|---|
| 5,412,428 | * | 5/1995 | Tahara | 348/396 |
| 5,708,732 | * | 1/1998 | Merhav et al. | 382/232 |
| 5,737,019 | * | 4/1998 | Kim | 348/390 |
| 5,777,677 | * | 7/1998 | Linzer et al. | 375/240.11 |
| 5,835,151 | * | 11/1998 | Sun et al. | 348/441 |
| 5,841,473 | * | 11/1998 | Chui et al. | 348/390 |
| 6,025,878 | * | 2/2000 | Boyce et al. | 375/240.16 |
| 6,100,932 | * | 6/2000 | Boyce et al. | 375/240.16 |

FOREIGN PATENT DOCUMENTS

| 0 740 269 | 10/1996 | (EP) | G06T/3/40 |
|---|---|---|---|
| 0 993 198 A2 | * 4/2000 | (EP) | H04N/7/26 |

OTHER PUBLICATIONS

Bao et al, "HDTV Down–Conversion Decoder," IEEE Transactions on Consumer Electronics, vol. 42, No. 3 Aug. 1996.*

Nakajima Y Et Al: "Rate Conversion of MPEG Coded Video by Re–Quantization Process" Journal of Experimental Medicine, vol. 3, Oct. 1995 (1995–10), pp. 408–411, Compl, XP000668776 ISSN: 0022–1077 abstract p. 408, right hand column, paragraph 2, p. 409, left hand column, paragraph 1.

Bhaskaran V: "Mediaprocessing in the Compressed Domain" Digest of Papers. Compcon, Jan. 1, 1996, pp. 204–209, XP000578934 p. 206, left–hand column, paragraph 2—p. 207, left hand column, paragraph 1.

Shih–Fu Chang Et Al: "Manipulation and Compositing of MC–DCT Compressed Video" IEEE Journal on Selected Areas in Communications, vol. 13, No. 1, Jan. 1, 1995, pp. 1–11, XP000492740 ISSN: 0733–8716 p. 4, right–hand column, paragraph D.—p. 5, left–hand colum n, paragraph E.

PCT/International Search Report our reference SAR 12756PCT application PCT/US99/10024 filing date Jul. 5, 1999.

* cited by examiner

*Primary Examiner*—Leo H. Boudreau
*Assistant Examiner*—Ishrat Sherali
(74) *Attorney, Agent, or Firm*—William J. Burke

(57) ABSTRACT

A method and apparatus for decoding, e.g., an MPEG-like video information stream comprising quantized discrete cosine transform (DCT) coefficients representing relatively high resolution image information to produce corresponding pixel blocks having a relatively low image by modifying a quantization matrix to dequantize DCT coefficients in a manner that allows for reduced complexity transformation of the dequantized DCT coefficients into sub-sampled image domain information.

22 Claims, 2 Drawing Sheets

DOWN-SAMPLING MPEG IMAGE DECODER

This application claims the benefit of U.S. Provisional Application No. 60/084,632, filed May 7, 1998.

The invention relates to communications systems generally and, more particularly, the invention relates to a method and apparatus for resizing at least image information in an information stream decoder, such as an MPEG-like video decoder.

BACKGROUND OF THE DISCLOSURE

In several communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable length code in digital communications systems. In particular, the above-referenced standards, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

It is known to compress (i.e., resize) image information to reduce decoder anchor frame memory requirements or to reduce decoder processing resources in, e.g., television systems utilizing relatively low resolution display devices. Such an application is the case of a high definition television (HDTV) receiver associated with a standard definition television (SDTV) display, or providing video information to a conventional NTSC, PAL or SECAM television.

A first known technique comprises decoding at the full HDTV resolution, storing the resulting full resolution pictures and perform filtering and down-sampling on the full resolution pictures before display. While this approach is very flexible in terms of resolutions supported, the cost is prohibitive since the frame-store memory must accommodate the full-resolution pictures. Even if filtering and down-sampling is performed prior to anchor frame storage, the computation complexity is the same as full resolution decoding.

A second known technique comprises, in the case of, e.g., 8×8 blocks of DCT coefficients received by an MPEG-like decoder, processing only the 4×4 lower (in terms of horizontal and vertical spatial resolution) sub-block of a DCT coefficient block (i.e., truncate the three 4×4 higher order sub-blocks). An inverse DCT operation performed on the lower 4×4 DCT coefficient block yields only a 4×4 pixel block. Both the IDCT computation complexity and the memory requirement for frame stores are reduced in this case.

A third technique is described in a paper published by Bao et al. (J. Bao, H. Sun and T. Poon, "HDTV Down-Conversion Decoder," IEEE Transactions on Consumer Electronics, Vol. 42, No. 3, August 1996) and incorporated herein by reference in its entirety. Specifically, the Bao technique processes, using a frequency synthesis technique, four adjacent 8×8 DCT coefficient blocks to produce a new 8×8 DCT coefficient block, which is then subjected to an inverse DCT processing to produce an 8×8 pixel block. In this manner both the IDCT computation complexity and the memory requirement for frame stores are reduced, with fewer visual artifacts than produced using the second technique described above.

Unfortunately, all of the above-described down-sampling decoders utilize a significant amount of computational resources to implement the inverse DCT function. Therefore, it is seen to be desirable to provide a down-sampling video image decoder providing for at least a greatly reduced inverse DCT resource.

SUMMARY OF THE INVENTION

The invention comprises a method and apparatus for decoding, e.g., an MPEG-like video information stream comprising quantized discrete cosine transform (DCI) coefficients representing relatively high resolution image information to produce corresponding pixel blocks having a relatively low image resolution. The decoding of the DCT coefficient blocks is effected in a manner avoiding inverse DCT processing, thereby reducing the computational complexity required to recover downsampled image information from an MPEG-like video information stream. The invention utilizes a modified quantization matrix to dequantize DCT coefficients in a manner that allows for reduced complexity transformation of the dequantized DCT coefficients into sub-sampled image domain information.

In an MPEG-like decoder, a method according to the invention for processing DCT coefficient blocks to produce respective pixel blocks, the DCT coefficient blocks representing image information associated with a first format, the pixel blocks representing image information associated with a second format, the second format having a lower resolution than the first format, the method comprising the steps of: dequantizing, using a modified quantization matrix ($Q'_{ij}$), the DCT coefficient blocks to produce respective dequantized DCT coefficient blocks; and transforming, using a down-sample transform C (S=FT=mC), the dequantized coefficient blocks to produce the respective pixel blocks.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of my invention can be readily utilized in any system decoding a compressed information stream including an information sub-stream to recover a sub-sampled and filtered version of said information sub-stream. While the invention will primarily be described in terms of an MPEG-like image stream decoder recovering sub-sampled (i.e., reduced resolution) image information, those skilled in the art will readily appreciate the many and varied applications of the invention.

Figure 1:
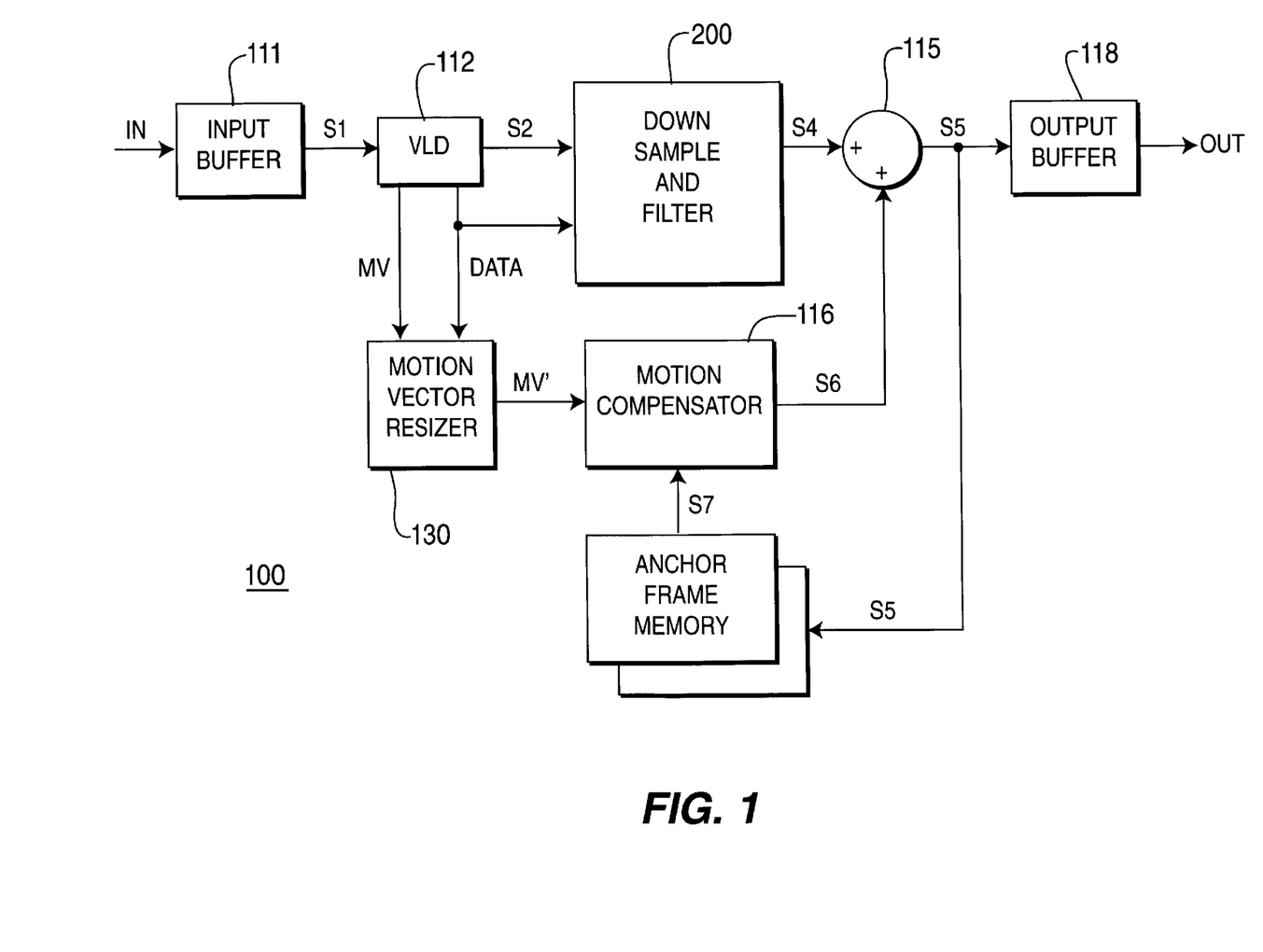
FIG. 1 depicts a high level block diagram of an embodiment of an MPEG-like decoder.

FIG. 1 depicts an embodiment of an MPEG-like decoder 100. Specifically, the decoder 100 of FIG. 1 receives and decodes a compressed video information stream IN to produce a video output stream OUT. The video output stream OUT is suitable for coupling to, e.g., a display driver circuit within a presentation device (not shown).

The MPEG-like decoder 100 comprises an input buffer memory module 111, a variable length decoder (VLD) module 112, a down-sample and filter module 200, a summer 115, a motion compensation module 116, an output buffer module 118, an anchor frame memory module 117 and a motion vector (MV) processor 130.

The input buffer memory module 111 receives the compressed video stream IN, illustratively a variable length encoded bitstream representing, e.g., a high definition television signal (HDTV) or standard definition television signal (SDTV) output from a transport demultiplexer/decoder circuit (not shown). The input buffer memory module 111 is used to temporarily store the received compressed video stream IN until the variable length decoder module 112 is ready to accept the video data for processing. The VLD 112 has an input coupled to a data output of the input buffer memory module 111 to retrieve, e.g., the stored variable length encoded video data as data stream S1.

The VLD 112 decodes the retrieved data to produce a constant length bit stream S2 comprising quantized prediction error DCT coefficients, a motion vector stream MV and a block information stream DATA.

It is important to note that in a typical MPEG-like decoder, a variable length decoder (such as VLD 112) is followed by an inverse quantizer module and an inverse DCT module. In such a decoder, the IQ module would normally perform an inverse quantization operation using a standard quantization matrix upon constant length bit stream S2 to produce a bit stream comprising de-quantized prediction error coefficients in a standard form. The IDCT module would then perform an inverse discrete cosine transform operation upon the de-quantized prediction error coefficients to produce a bitstream S4 comprising pixel-by-pixel prediction errors. The MPEG-like decoder 100 of FIG. 1 does not operate in this manner.

The down-sample and filter module 200 of the MPEG-like decoder 100 of FIG. 1 receives the quantized prediction error DCT coefficients within the constant length bit stream S2 and responsively produces a bitstream S4 comprising down-sampled pixel-by-pixel prediction errors. Specifically, the down-sample and filter module 200 receives quantized DCT coefficient blocks representing image information associated with a first format (e.g., HDTV) and responsively produces pixel blocks representing image information associated with a second format (e.g., SDTV), where the second format has a lower resolution than the first format. For example, in one embodiment of the invention, 8×8 DCT coefficient blocks that would normally be processed to produce 8×8 pixel blocks are instead processed to produce 4×4 pixel blocks. This processing is done in the frequency domain and without performing a full inverse discrete cosine transform. The operation of the down-sample and filter module 200 will be explained in greater detail below with respect to FIGS. 2 and 3.

The summer 115 adds the down-sampled pixel-by-pixel prediction error stream S4 to a motion compensated predicted pixel value stream S6 produced by the motion compensation module 116. Thus, the output of summer 115 is, in the exemplary embodiment, a reduced resolution video stream S5 comprising reconstructed pixel values. The reduced resolution video stream S5 produced by summer 115 is coupled to output buffer module 118 and the anchor frame memory module 117.

The anchor frame memory module 117 receives and stores anchor frame information within the reduced resolution video stream S5. Advantageously, the size of the anchor frame memory module 117 may be reduced by an amount substantially consistent with the reduction in resolution (i.e., scaling or compression) imparted to the video information within the received video input information stream IN by the down-sample and filter module 200.

The motion vector resizer 130 receives the motion vector stream MV and block information stream DATA from the VLD 112. The motion vector stream MV comprises motion vector information to be used by the motion compensation module 116 to predict individual macroblocks based upon image information stored in the anchor frame memory module. However, since the image information stored in the anchor frame memory module 117 has been scaled by the down-sample and filter module 200 as described above, it is also necessary to scale motion vector data used to predict macroblocks using the scaled pixel information. Thus the motion vectors MV received from the VLD module 112 are scaled and coupled to the motion compensation module 116 as scaled motion vectors MV'.

The motion compensation module 116 accesses the compressed (i.e., scaled) image information stored in anchor frame memory module 117 via signal path S7 and the scaled motion vector(s) MV' from the motion vector resizer 130 to produce a scaled predicted macroblock. That is, the motion compensation module 116 utilizes one or more stored anchor frames (e.g., the reduced resolution pixel blocks generated with respect to the most recent I-frame or P-frame of the video signal produced at the output of the summer 115), and the motion vector(s) MV' received from the motion vector resizer 130, to calculate the values for each of a plurality of scaled predicted macroblocks, which are coupled to an input of adder 115 as motion compensated predicted pixel value stream S6.

The down-sample and filter module 200 of the decoder 100 of FIG. 1 imparts a pre-determined scaling or compression factor to the quantized prediction error DCT coefficients forming the received residual video information within the constant length bit stream S2. Similarly, the motion vector resizer 130 imparts substantially the same scaling or compression factor to the motion vectors associated with the received residual video information within the constant length bit stream S2. In this manner, the decoder 100 produces, at the output, a reduced resolution or scaled image information stream OUT for display on, e.g., a reduced resolution display device.

Figure 2:
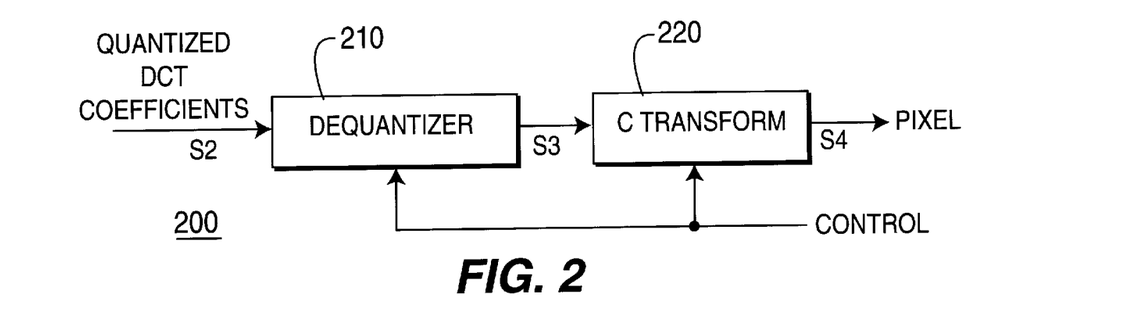
FIG. 2 depicts a high level block diagram of a down-sample and filter module suitable for use in the MPEG-like decoder of FIG. 1.

FIG. 2 depicts a high level block diagram of a down-sample and filter module suitable for use in the MPEG-like decoder of FIG. 1. Specifically, FIG. 2 depicts a down-sample and filter module 200 comprising a dequantizer 210 and a C transform module 220. The dequantizer 210 and a C transform module 220 are optionally responsive to a control signal CONTROL produced by a controller (not shown).

The dequantizer 210 receives the constant length bit stream S2, which comprises quantized prediction error DCT coefficients, and responsively dequantizes each DCT coefficient block according to a modified quantization matrix. That is, DCT coefficient blocks within the constant length bit stream S2 have been quantized in a known manner during an MPEG-like encoding process according to, e.g., the MPEG quantizer_scale and quantizer_matrix parameters. The dequantizer 210 utilizes a modified (i.e., non-standard) quantization matrix instead of the quantization matrix normally associated with the received DCT coefficient block (i.e., the quantizer matrix indicated by syntactical norms).

$$T=\{t_{ij}\}_{8\times 8} \quad \text{(equation 2)}$$

Multiplying the filter matrix F by the IDCT transform T, a new frequency transform S may be derived, as shown below with respect to equations 3–6:

$$S = FT = \begin{bmatrix} s00 & s01 & s02 & s03 & s04 & s05 & s06 & s07 \\ s10 & s11 & s12 & s13 & s14 & s15 & s16 & s17 \\ s20 & s21 & s22 & s23 & s24 & s25 & s26 & s27 \\ s30 & s31 & s32 & s33 & s34 & s35 & s36 & s37 \end{bmatrix} \quad \text{(equation 3)}$$

$$S = FT = \begin{bmatrix} m0C00 & m1C01 & m2C02 & m3C03 & m4C04 & m5C05 & m6C06 & m7C07 \\ m0C10 & m1C11 & m2C12 & m3C13 & m4C14 & m5C15 & m6C16 & m7C17 \\ m0C20 & m1C21 & m2C22 & m3C23 & m4C24 & m5C25 & m6C26 & m7C27 \\ m0C30 & m1C31 & m2C32 & m3C33 & m4C34 & m5C35 & m6C36 & m7C37 \end{bmatrix} \quad \text{(equation 4)}$$

$$S = FT = \begin{bmatrix} C00 & C01 & C02 & C03 & C04 & C05 & C06 & C07 \\ C10 & C11 & C12 & C13 & C14 & C15 & C16 & C17 \\ C20 & C21 & C22 & C23 & C24 & C25 & C26 & C27 \\ C30 & C31 & C32 & C33 & C34 & C35 & C36 & C37 \end{bmatrix} \cdot \begin{bmatrix} m0 & 0 & 0 & 0 & 0 & 0 & 0 & 0 \\ 0 & m1 & 0 & 0 & 0 & 0 & 0 & 0 \\ 0 & 0 & m2 & 0 & 0 & 0 & 0 & 0 \\ 0 & 0 & 0 & m3 & 0 & 0 & 0 & 0 \\ 0 & 0 & 0 & 0 & m4 & 0 & 0 & 0 \\ 0 & 0 & 0 & 0 & 0 & m5 & 0 & 0 \\ 0 & 0 & 0 & 0 & 0 & 0 & m6 & 0 \\ 0 & 0 & 0 & 0 & 0 & 0 & 0 & m7 \end{bmatrix} \quad \text{(equation 5)}$$

The modified dequantized DCT coefficient blocks are coupled to the C transform module 220 as stream S3.

The C transform module 220 receives the modified dequantized DCT coefficient blocks and responsively processed these blocks in the frequency domain to produce respective down-sampled and filtered pixel blocks in the image domain. The C transform module 220 is not an inverse DCT module. Rather, the C transform module comprises a frequency domain processing module adapted to operate upon the dequantized DCT coefficient blocks in a manner complementary to the modified dequantization performed by the dequantizer 210.

The complementary nature of the dequantization and C transform operations will now be explained in more detail with respect to several examples.

During a known MPEG-like encoding process, each (illustratively) 8×8 block of pixel values produces an 8×8 array of DCT coefficients. The relative precision accorded to each of the 64 DCT coefficients is selected according to its relative importance in human visual perception. The relative coefficient precision information is represented by a quantizer matrix, which is an 8-by-8 array of values. Each value in the quantizer matrix represents the coarseness of quantization of the related DCT coefficient.

The down-sample and filter module 200 of the decoder 100 of FIG. 1 utilizes a down-sampling filter of the form depicted below in equation 1, assuming that 8×8 DCT coefficient blocks are being converted into 4×4 pixel blocks:

$$F = \begin{bmatrix} f00 & f01 & f02 & f03 & f04 & f05 & f06 & f07 \\ f10 & f11 & f12 & f13 & f14 & f15 & f16 & f17 \\ f20 & f21 & f22 & f23 & f24 & f25 & f26 & f27 \\ f30 & f31 & f32 & f33 & f34 & f35 & f36 & f37 \end{bmatrix}_{8\times 4} \quad \text{(equation 1)}$$

An IDCT transform T suitable for processing DCT coefficient blocks into pixel blocks is given by equation 2 as follows:

$$S=FT=C \cdot m \quad \text{(equation 6)}$$

Each of the dequantized DCT coefficient blocks A produced by the standard dequantization process may be described per equation 7 as follows, where:

$A_{ij}$ represents a dequantized, illustratively, 8×8 DCT matrix;

$Q_{ij}$ represents the standard quantizer matrix;

q represents the standard quantization scale value; and $Z_{ij}$ represents a received, illustratively, 8×8 DCT coefficient block or matrix.

$$A_{ij}=q \cdot Q_{ij} \cdot Z_{ij} \quad \text{(equation 7)}$$

Therefore, the downsized image domain 4×4 pixel blocks $B_{ij}$ may be defined per equation 8 as:

$$B=FT \cdot A(FT)'=C \cdot MA \cdot M' \cdot C'=CYC' \quad \text{(equation 8)}$$

It is noted that standard decoders utilize a quantizer function of the form depicted below in equation 9, where:

$A_{ij}$ represents a dequantized, illustratively, 8×8 DCT matrix;

$Q_{ij}$ represents the standard quantizer matrix;

q represent the standard quantization scale value; and $Z_{ij}$ represents a received, illustratively, 8×8 DCT coefficient block or matrix.

$$A_{ij}=qQ_{ij} \cdot Z_{ij} \quad \text{(equation 9)}$$

However, decoder of the subject invention utilizes a dequantizer of the form depicted below with respect to equation 10, where:

$A_{ij}$ represents a dequantized, illustratively, 8×8 DCT matrix;

$Q_{ij}$ represents the standard quantizer matrix;

q represent the standard quantization scale value; and $Z_{ij}$ represents a received, illustratively, 8×8 DCT coefficient block or matrix. and $m_i$ and $m_j$ are common factors for each row and column of the matrix (FT), such that $C \cdot m = F \cdot T$, where C has a form providing for less complex computation.

$$Y_{ij} = q(Q_{ij} m_i m_j) \cdot Z_{ij} \qquad \text{(equation 10)}$$

It should be noted that the term: $Q_{ij} m_i m_j$ may be pre-calculated and defined as the term $Q'_{ij}$, thereby reducing the amount of calculations necessary to perform the dequantization process.

Several examples illustrating the operation of the invention will now be described. Briefly, a one dimensional example will first be provided to provide a simplified framework for discussing two subsequent two dimensional examples (non-interlaced video DCT coefficients and interlaced video DCT coefficients).

A. One Dimensional Example

All linear transform and filtering can be represented in the form of matrix multiplications. For simplicity, the one-dimensional case is first considered. Specifically, assume that a 1×8 image domain pixel vector $x = \{x0, \ldots, x7\}$ has a DCT transform of $X = \{X0, \ldots, X7\}$. The IDCT transform is an 8×8 matrix denoted as T and the desired down-sampling filter is a 4×8 matrix denoted as F. Therefore, the desired filtering in the image domain may be represented by equation 11, follows:

$$y^T = F \cdot x^T = F \cdot T \cdot X^T = S \cdot X^T \qquad \text{(equation 11)}$$

where $y = \{y0, \ldots, y7\}$ is the subsampled image domain pixels; and a new transform comprising a 4×8 matrix that is used to obtain the image domain pixels directly is given below, with respect to equation 12.

$$S = F \cdot T \qquad \text{(equation 12)}$$

B. Non-Interlaced Frame-mode Coding Example

An embodiment of the invention suitable for use in an MPEG-like decoder processing non-interlaced image information coded into 8×8 frame-based DCT coefficients to produce 4×4 pixel blocks will now be discussed. For this embodiment, a filter F providing a two to one down-sampling is used, illustratively the piece-wise averaging down sampling filter of equation 13.

$$F = \frac{1}{2} \cdot \begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \end{bmatrix}_{8 \times 4} \qquad \text{(equation 13)}$$

Thus, the down-sample transform S in this embodiment is given by equation 14 as follows:

$$S = F \cdot T = C \cdot \qquad \text{(equation 14)}$$

$$m = \begin{bmatrix} 0.3536 & 0.4531 & 0.3266 & 0.1591 & 0 & -0.1063 & -0.1353 & -0.0901 \\ 0.3536 & 0.1877 & -0.3266 & -0.3841 & 0 & 0.2566 & 0.1353 & -0.0373 \\ 0.3536 & -0.1877 & -0.3266 & 0.3841 & 0 & -0.2566 & 0.1353 & 0.0373 \\ 0.3536 & -0.4531 & 0.3266 & -0.1591 & 0 & 0.1063 & -0.1353 & 0.0901 \end{bmatrix}$$

Assuming that the 8×8 DCT matrix is denoted as A, then the filtering and down-sampling into a 4×4 image domain pixel block denoted as B may be described by equation 15 as:

$$B = SAS^T = C(M \otimes A) C^T \qquad \text{(equation 15)}$$

where:

$\otimes$ represents an element by element multiplication of two matrices;

the matrix C is given by equation 16 (below);

c is set equal to one less than the square root of 2 (i.e., 0.4142);

M is the product of $m^T$ and m (i.e., $M = m^T \cdot m$); and m = [0.3536 0.4531 0.3266 0.3841 0 0.2566 0.1353 0.0900].

$$C = \begin{bmatrix} 1 & 1 & 1 & c & 0 & -c & -1 & -1 \\ 1 & c & -1 & -1 & 0 & 1 & 1 & -c \\ 1 & -c & -1 & 1 & 0 & -1 & 1 & c \\ 1 & -1 & 1 & -c & 0 & c & -1 & 1 \end{bmatrix} \qquad \text{(equation 16)}$$

Thus, it can be seen by inspection of equation 16 that only columns 2, 4, 6 and 8 of the matrix (i.e., those columns including "c") require a multiplication operation during processing, the other columns only require addition operations. In this manner a significant savings in computational loading is effected.

Assuming that Z is the quantized 8×8 DCT coefficient matrix, Q is the quantization matrix and q is the quantization scaling factor, then the dequantized DCT coefficient matrix A is given by equation 17 as follows:

$$A = q \cdot Q \otimes Z \qquad \text{(equation 17)}$$

Applying S to both the horizontal and vertical directions of A to obtain a 4×4 subsampled image domain is accomplished via equation 18, as follows:

$$B = C \cdot (q \cdot (M \otimes Q) \otimes Z) \cdot C^T = C \cdot (q \cdot P \cdot Z) \cdot C^T \qquad \text{(equation 18)}$$

It should be noted that $P = (M \otimes Q)$ and is independent of the quantized coefficients. Therefore, P may be pre-calculated by the apparatus of FIG. 1 to replace Q as the quantization matrix, advantageously saving computation time and resources by directly applying S to the DCT coefficients.

C. Interlaced Frame-mode Coding Embodiment

An embodiment of the invention suitable for use in an MPEG-like decoder processing interlaced image information coded into 8×8 frame-based DCT coefficients to produce 4×4 pixel blocks will now be discussed. For this embodiment, a filter F providing a two to one down-sampling is used, illustratively the piece-wise averaging down sampling filter of equation 19. The teachings discussed above with respect to the non-interlaced frame mode coding embodiment apply to this embodiment, except where defined otherwise.

$$F = \frac{1}{2} \cdot \begin{bmatrix} 1 & 0 & 1 & 0 & 0 & 0 & 0 & 0 \\ 0 & 1 & 0 & 1 & 0 & 0 & 0 & 0 \\ 0 & 0 & 0 & 0 & 1 & 0 & 1 & 0 \\ 0 & 0 & 0 & 0 & 0 & 1 & 0 & 1 \end{bmatrix}_{8 \times 4}$$ (equation 19)

Thus, the down-sample transform S in this embodiment is given by equation 20, while C is given by equation 21 as follows:

$$S = F \cdot T = C \cdot$$ (equation 20)

$$m = \begin{bmatrix} 0.3536 & 0.3841 & 0.1353 & -0.0373 & 0 & 0.1877 & 0.3266 & 0.2566 \\ 0.3536 & 0.2566 & -0.1353 & -0.1877 & 0 & -0.0373 & -0.3266 & -0.3841 \\ 0.3536 & -0.2566 & -0.1353 & 0.1877 & 0 & 0.0373 & -0.3266 & 0.3841 \\ 0.3536 & -0.3841 & 0.1353 & 0.0373 & 0 & -0.1877 & 0.3266 & -0.2566 \end{bmatrix}$$

$$C = \begin{bmatrix} 1 & 1 & 1 & c_0 & 0 & 1 & 1 & c_1 \\ 1 & c_1 & -1 & -1 & 0 & -c_0 & -1 & -1 \\ 1 & -c_1 & -1 & 1 & 0 & c_0 & -1 & 1 \\ 1 & -1 & 1 & c_0 & 0 & -1 & 1 & -c_1 \end{bmatrix}$$ (equation 21)

where:

$c_0 = 0.1989$;

$c_1 = 0.6682$; and m is given by m=[0.3536 0.3841 0.1351 0.1877 0 0.1877 0.3266 0.3841].

In the case of 1920×1080 image having been frame-mode encoded, the filter F provides, illustratively an eight to three down-sampling, such as given in equation 22 as follows:

$$F = \frac{1}{2} \cdot \begin{bmatrix} 3/8 & 3/8 & 1/4 & 0 & 0 & 0 & 0 & 0 \\ 0 & 0 & 1/8 & 3/8 & 3/8 & 1/8 & 0 & 0 \\ 0 & 0 & 0 & 0 & 0 & 1/4 & 3/8 & 3/8 \end{bmatrix}$$ (equation 22)

Thus, the down-sample transform S in this embodiment is given by equation 23, while C is given by equation 24 as follows:

$$S = F \cdot T = C \cdot m = \begin{bmatrix} 0.3536 & 0.4902 & 0.1971 & -0.0033 & -0.0884 & -0.0553 & -0.0140 & 0.0363 \\ 0.3536 & 0 & -0.3943 & 0 & 0.1768 & 0 & -0.0280 & 0 \\ 0.3536 & -0.4902 & 0.1971 & 0.0033 & -0.0884 & 0.0553 & 0.0140 & -0.0363 \end{bmatrix}$$ (equation 23)

$$C = \begin{bmatrix} 1 & 1 & 1/2 & -1 & -1/2 & -1 & 1/2 & 1 \\ 1 & 0 & -1 & 0 & 1 & 0 & -1 & 0 \\ 1 & -1 & 1/2 & 1 & -1/2 & 1 & 1/2 & -1 \end{bmatrix}$$ (equation 24)

where m is given by:

m=[0.3536 0.4092 0.3943 0.0033 0.1768 0.0553 0.0280 0.0363].

Figure 3:
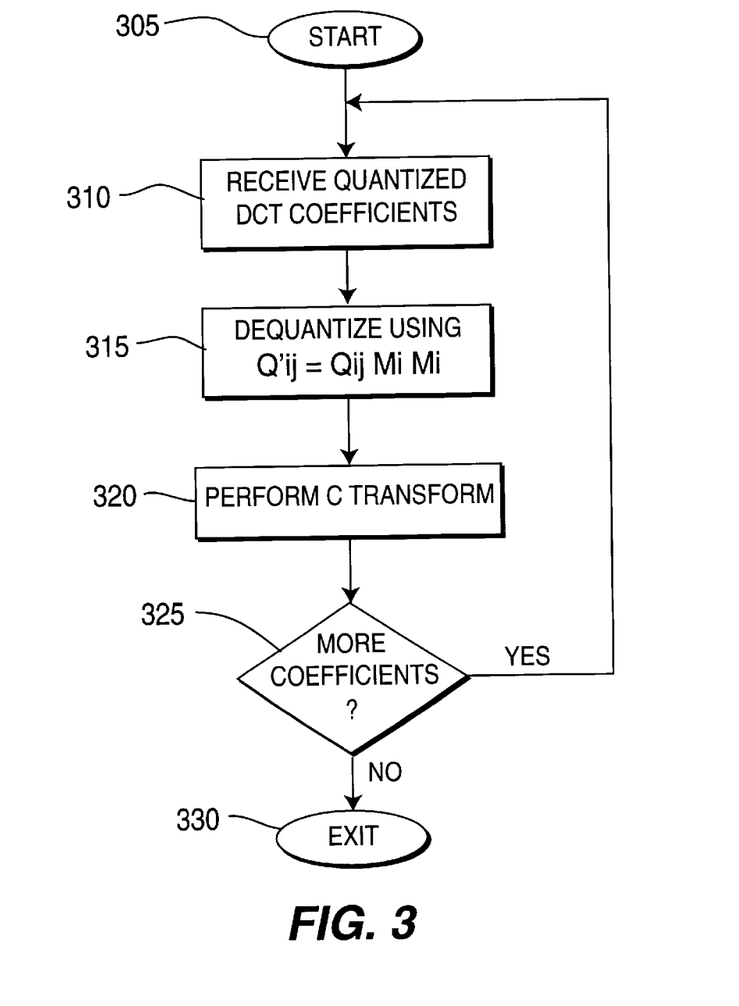
FIG. 3 depicts a flow diagram of a method for processing DCT coefficients suitable for use in the MPEG-like decoder of FIG. 1 and the down-sample and filter module of FIG. 2.

FIG. 3 depicts a flow diagram of a method for processing DCT coefficients suitable for use in the MPEG-like decoder of FIG. 1 and the down-sample and filter module of FIG. 2. Specifically, the method 300 of FIG. 3 is suitable for processing DCT coefficients representing relatively high resolution image information to produce relatively low resolution image domain pixel blocks.

The method 300 is entered at step 305 and proceeds to step 310, where, illustratively, an 8×8 DCT coefficient block is received by, e.g., the dequantizer 210 of the down-sample and filter module 200 of FIG. 2. The method 300 then proceeds to step 315.

At step 315, the received DCT coefficient block $Z_{ij}$ is dequantized to produce a respective dequantized DCT coefficient block $Y_{ij}$ using the modified quantization matrix $Q'_{ij}$ as discussed above with respect to equation 10, namely: $Y_{ij}=q(Q_{ij}m_i m_j) \cdot Z_{ij}$, where $Y_{ij}$ represents a dequantized DCT matrix produced using the modified quantization matrix; $Q_{ij}$ represents a standard quantizer matrix; q represent a standard quantization scale value; $Z_{ij}$ represents a received DCT coefficient block; and $m_i$ and $m_j$ are common factors for each row and column of the matrix (FT), wherein C·m=F·T;

where F represents a down-sampling filter adapted to reducing image information having said first format into image information having said second format, said first image information associated with said first format, said pixel blocks representing image information associated with a second format; and T represents an inverse discrete cosine transform function. The method 300 then proceeds to step 320.

At step 320, each of the dequantized DCT coefficient blocks Y are subjected to a C Transform such as discussed above with respect to equation 8, namely: B=CYC', where B represents a downsized image domain pixel block; C represents a new transform, Y represents a dequantized DCT matrix produced using the modified quantization matrix; and C' represents the inverse of C. The method 300 then proceeds to step 325.

At step 325 a query is made as to whether more DCT coefficients are to be processed. If the query is answered affirmatively, then the method 300 proceeds to step 310, where the next DCT coefficient block is received. If the query is answered negatively, then the method 300 proceeds to step 330, where it is exited.

It will be appreciated by those skilled in the art that the teachings of the above examples may be mixed and matched for either horizontal dimension DCT or vertical dimension DCT. For example, the teachings of example B (Non-Interlaced frame-mode coding example) may be usefully applied to decoding interlaced image information in the vertical direction.

D. Reduction in Computational Complexity

The following examples of one and two dimensional computational loading of a processor will serve to illustrate the reduction in computational requirements effected by the invention. Specifically, using a C transform such as that developed and discussed above with respect to equation 16 (reproduced below), assume that a one dimensional IDCT vector Y=[y0 y1 y2 y3 y4 y5 y6 y7]$^T$ is to be processed to produce a one dimensional image domain vector B=[b0 b1 b2 b3].

$$C = \begin{bmatrix} 1 & 1 & 1 & c & 0 & -c & -1 & -1 \\ 1 & c & -1 & -1 & 0 & 1 & 1 & -c \\ 1 & -c & -1 & 1 & 0 & -1 & 1 & c \\ 1 & -1 & 1 & -c & 0 & c & -1 & 1 \end{bmatrix} \quad \text{(equation 16)}$$

A series of mathematical manipulations are performed by a processor calculating the one dimension image domain vector according to the equation B=C·Y as follows:

$x0 = y1 - y7;$ (step 1)

$x1 = y3 - y5;$ (step 2)

$x2 = y2 - y6;$ (step 3)

$z0 = c \cdot x0;$ (step 4)

$z1 = c \cdot x1;$ (step 5)

$z3 = y0 + x2;$ (step 6)

$z4 = y0 - x2;$ (step 7)

$z5 = x0 + z1;$ (step 8)

$z6 = z0 - x1;$ (step 9)

$b0 = z3 + z5;$ (step 10)

$b1 = z4 + z6;$ (step 11)

$b2 = z4 - z6;$ and (step 12)

$b3 = z3 - z5.$ (step 13)

The above thirteen steps result in, essentially, a combined one dimensional 8-point IDCT and sub-sampling operation that requires 11 addition operations and two multiplication operations to calculate the pixel domain vector B using the method of the invention. By contrast, a standard one dimensional 8-point IDCT operation requires 11 multiplications and 29 additions, while a standard pixel domain filtering comprising an averaging operation requires four additions. Thus, the invention provides a significant advantage in terms of processing and memory resource utilization (11 addition operations and two multiplication operations versus 33 additions and 11 multiplications).

Similarly, for the two dimensional case assume that an 8×8 DCT coefficient block is processed according to the invention to produce a 4×4 pixel block. In this example, the 8×8 DCT coefficient block is dequantized and matrix filtered to produce an 8×4 intermediate matrix. That is, the modified quantization matrix used to dequantize the 8×8 DCT coefficient block produces a dequantized and matrix filtered 8×4 DCT coefficient block. This intermediate matrix is further filtered to produce, e.g., the 4×4 image domain or pixel block.

Each of the eight columns and four rows of the intermediate matrix are processed using a one dimensional filtering operation, such as the thirteen step processing operation described above with respect to the one dimensional example. Thus, the two dimensional example (8×8 DCT domain to 4×4 image domain) the total number of operations comprises 24 multiplications (2×12) and 132 additions (11×12) versus the conventional processing load of 132 multi-plications (11×12) and 396 additions (33×12). Thus, the invention advantageously provides a significant reduction in processing operations over conventional methods in the case of decoding DCT coefficients having a relatively high resolution to produce image information having a relatively low resolution.

Although various embodiments which incorporate the teachings of the present invention have been shown and described in detail herein, those skilled in the art can readily devise many other varied embodiments that still incorporate these teachings.

What is claimed is:

1. A method for processing DCT coefficient blocks produce respective pixel blocks, said DCT coefficient blocks representing image information associated with a first format, said pixel blocks representing image information associated with a second format, said second format having a lower resolution than said first format, said methods comprising the steps of:

dequantizing, using a modified quantization matrix, said DCT coefficient blocks to produce respective dequantized DCT coefficient blocks; and transforming, using a down-sample transform, said dequantized coefficient blocks to produce said respective pixel blocks, wherein said step of dequantizing said DCT coefficients is performed substantially in accordance with the equation:

$$Y_{ij}=q(Q_{ij}m_im_j) \cdot Z_{ij}$$

where $Y_{ij}$ represents a dequantized DCT matrix; $Q_{ij}$ represents a standard quantizer matrix; q represent a standard quantization scale value; $Z_{ij}$ represents a received DCT coefficient block and $m_i$ and $m_j$ are common factors for each row and column of the matrix (FT) according to the equation:

$$C \cdot m = F \cdot T$$

where F represents a down-sampling filter adapted to reducing image information having said first format into image information having said second format, said first image information associated with said first format, said pixel blocks representing image information associated with a second format; and T represents an inverse discrete cosine transform function.

2. A method for processing DCT coefficient blocks to produce respective pixel blocks, said DCT coefficient blocks representing image information associated with a first format, said pixel blocks representing image information associated with a second format, said second format having a lower resolution than said first format, said method comprising the steps of:

dequantizing, using a modified quantization matrix said DCT coefficient blocks to produce respective dequantized DCT coefficient blocks; and transforming, using a down-sample transform, said dequantized coefficient blocks to produce said respective pixel blocks, wherein said step of transforming said dequantized coefficient blocks is performed substantially in accordance with the equation:

$$B=CYC'$$

where B represents a downsized image domain pixel block; C represents a C transform matrix; Y represents a dequantized DCT matrix; and C' represents the inverse of C.

3. The method of claim 2, wherein:

said DCT coefficient blocks comprise 8×8 DCT coefficient blocks representing 8×8 non-interlaced frame-mode coded original pixel blocks;

said produced pixel blocks comprise 4×4 pixel blocks; and said down-sample transform is effected substantially in accordance with the equation:

$$S = F \cdot T = C \cdot m = \begin{bmatrix} 0.3536 & 0.4531 & 0.3266 & 0.1591 & 0 & -0.1063 & -0.1353 & -0.0901 \\ 0.3536 & 0.1877 & -0.3266 & -0.3841 & 0 & 0.2566 & 0.1353 & -0.0373 \\ 0.3536 & -0.1877 & -0.3266 & 0.3841 & 0 & -0.2566 & 0.1353 & 0.0373 \\ 0.3536 & -0.4531 & 0.3266 & -0.1591 & 0 & 0.1063 & -0.1353 & 0.0901 \end{bmatrix}.$$

4. The method of claim 3, wherein F is defined substantially in accordance with the equation:

$$F = \frac{1}{2} \cdot \begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \end{bmatrix}.$$

5. The method of claim 3, wherein C and m are defined substantially in accordance with the equations:

$$C = \begin{bmatrix} 1 & 1 & 1 & c & 0 & -c & -1 & -1 \\ 1 & c & -1 & -1 & 0 & 1 & 1 & -c \\ 1 & -c & -1 & 1 & 0 & -1 & 1 & c \\ 1 & -1 & 1 & -c & 0 & c & -1 & 1 \end{bmatrix}; \text{ and}$$

m=[0.3536  0.4531  0.3266  0.3841  0  0.2566  0.1353  0.0900].

6. The method of claim 2, wherein:

said DCT coefficient blocks comprise 8×8 DCT coefficient blocks representing 8×8 interlaced frame-mode coded original pixel blocks;

said produced pixel blocks comprise 4×4 pixel blocks; and said down-sample transform is effected substantially in accordance with the equation:

$$S = F \cdot T = C \cdot m = \begin{bmatrix} 0.3536 & 0.3841 & 0.1353 & -0.0373 & 0 & 0.1877 & 0.3266 & 0.2566 \\ 0.3536 & 0.2566 & -0.1353 & -0.1877 & 0 & -0.0373 & -0.3266 & -0.3841 \\ 0.3536 & -0.2566 & -0.1353 & 0.1877 & 0 & 0.0373 & -0.3266 & 0.3841 \\ 0.3536 & -0.3841 & 0.1353 & 0.0373 & 0 & -0.1877 & 0.3266 & -0.2566 \end{bmatrix}$$

7. The method of claim 6, wherein F is defined substantially in accordance with the equation:

$$F = \frac{1}{2} \cdot \begin{bmatrix} 1 & 0 & 1 & 0 & 0 & 0 & 0 & 0 \\ 0 & 1 & 0 & 1 & 0 & 0 & 0 & 0 \\ 0 & 0 & 0 & 0 & 1 & 0 & 1 & 0 \\ 0 & 0 & 0 & 0 & 0 & 1 & 0 & 1 \end{bmatrix}.$$

8. The method of claim 6, wherein C and m are defined substantially in accordance with the equations:

$$C = \begin{bmatrix} 1 & 1 & 1 & c_0 & 0 & 1 & 1 & c_1 \\ 1 & c_1 & -1 & -1 & 0 & -c_0 & -1 & -1 \\ 1 & -c_1 & -1 & 1 & 0 & c_0 & -1 & 1 \\ 1 & -1 & 1 & c_0 & 0 & -1 & 1 & -c_1 \end{bmatrix}$$

where $c_0$=0.1989; $c_1$=0.6682; and m=[0.3536  0.3841  0.1351  0.1877  0  0.1877  0.3266  0.3841].

9. The method of claim 2, wherein:

said DCT coefficient blocks comprise 8×8 DCT coefficient blocks representing 8×8 interlaced 1920×1080 resolution frame-mode coded original pixel blocks;

said produced pixel blocks comprise 4×4 pixel blocks; and said down-sample transform is effected substantially in accordance with the equation:

$$S = F \cdot T =$$

$$C \cdot m = \begin{bmatrix} 0.3536 & 0.4902 & 0.1971 & -0.0033 & -0.0884 & -0.0553 & -0.0140 & 0.0363 \\ 0.3536 & 0 & -0.3943 & 0 & 0.1768 & 0 & -0.0280 & 0 \\ 0.3536 & -0.4902 & 0.1971 & 0.0033 & -0.0884 & 0.0553 & 0.0140 & -0.0363 \end{bmatrix}$$

10. The method of claim 7, wherein F is defined substantially in accordance with the equation:

$$F = \frac{1}{2} \cdot \begin{bmatrix} 3/8 & 3/8 & 1/4 & 0 & 0 & 0 & 0 & 0 \\ 0 & 0 & 1/8 & 3/8 & 3/8 & 1/8 & 0 & 0 \\ 0 & 0 & 0 & 0 & 0 & 1/4 & 3/8 & 3/8 \end{bmatrix}.$$

11. The method of claim 7, wherein C and m are defined substantially in accordance with the following equations:

$$C = \begin{bmatrix} 1 & 1 & 1/2 & -1 & -1/2 & -1 & 1/2 & 1 \\ 1 & 0 & -1 & 0 & 1 & 0 & -1 & 0 \\ 1 & -1 & 1/2 & 1 & -1/2 & 1 & 1/2 & -1 \end{bmatrix} ; \text{ and}$$

m=[0.3536 0.4092 0.3943 0.0033 0.1768 0.0553 0.0280 0.0363].

12. Apparatus for processing DCT coefficient blocks to produce respective pixel blocks, said DCT coefficient blocks representing image information associated with a first format, said pixel blocks representing image information associated with a second format, said second format having a lower resolution than said first format, said apparatus comprising:
a dequantizer for dequantizing, using a modified quantization matrix, said DCT coefficient blocks to produce respective dequantized DCT coefficient blocks; and
a transform module, using a down-sample transform, said dequantized coefficient blocks to produce said respective pixel blocks;
wherein said dequantizer dequantizes said DCT coefficients is performed substantially in accordance with the equation:

$$Y_{ij}=q(Q_{ij}m_im_j) \cdot Z_{ij}$$

where $Y_{ij}$ represents a dequantized DCT matrix; $Q_{ij}$ represents a standard quantizer matrix; q represent a standard quantization scale value; $Z_{ij}$ represents a received DCT coefficient block; and $m_i$ and $m_j$ are common factors for each row and column of the matrix (FT) according to the equation:

$$C \cdot m = F \cdot T$$

where F represents a down-sampling filter adapted to reducing image information having said first format into image information having said second format, said first image information associated with said first format, said pixel blocks representing image Information associated with a second format; and T represents an inverse discrete cosine transform function.

13. Apparatus for processing DCT coefficient blocks to produce respective pixel blocks, said DCT coefficient blocks representing image information associated with a first format, said pixel blocks representing image information associated With a second format, said second format having a lower resolution than said first format, said apparatus comprising:
a dequantizer for dequantizing, using a modified quantization matrix, said DCT coefficient blocks to produce respective dequantized DCT coefficient blocks;
and a transform module, using a dowm-sample transform, said dequantized coefficient blocks to produce said respective pixel blocks;
wherein said transform module operates substantially in accordance with the equation:

$$B=CYC'$$

where B represents a downsized image domain pixel block; C represents a C transform matrix; Y represents a dequantized DCT matrix; and C' represents the inverse of C.

14. The apparatus of claim 13, wherein:
said DCT coefficient blocks comprise 8×8 DCT coefficient blocks representing 8×8 non-interlaced frame-mode coded original pixel blocks;
said produced pixel blocks comprise 4×4 pixel blocks; and
said transform module effects a down-sample transform substantially in accordance with the equation:

$$S = F \cdot T = C \cdot m = \begin{bmatrix} 0.3536 & 0.4531 & 0.3266 & 0.1591 & 0 & -0.1063 & -0.1353 & -0.0901 \\ 0.3536 & 0.1877 & -0.3266 & -0.3841 & 0 & 0.2566 & 0.1353 & -0.0373 \\ 0.3536 & -0.1877 & -0.3266 & 0.3841 & 0 & -0.2566 & 0.1353 & 0.0373 \\ 0.3536 & -0.4531 & 0.3266 & -0.1591 & 0 & 0.1063 & -0.1353 & 0.0901 \end{bmatrix}$$

15. The apparatus of claim 14, wherein F is defined substantially in accordance with the equation:

$$F = \frac{1}{2} \cdot \begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \end{bmatrix}.$$

16. The apparatus of claim 14, wherein C and m are defined substantially in accordance with the equations:

$$C = \begin{bmatrix} 1 & 1 & 1 & c & 0 & -c & -1 & -1 \\ 1 & c & -1 & -1 & 0 & 1 & 1 & -c \\ 1 & -c & -1 & 1 & 0 & -1 & 1 & c \\ 1 & -1 & 1 & -c & 0 & c & -1 & 1 \end{bmatrix} ; \text{ and}$$

m=[0.3536 0.4531 0.3266 0.3841 0 0.2566 0.1353 0.0900].

17. The apparatus of claim 13, wherein:
said DCT coefficient blocks comprise 8×8 DCT coefficient blocks representing 8×8 interlaced frame-mode coded original pixel blocks;
said produced pixel blocks comprise 4×4 pixel blocks; and said transform module effects a down-sample transform substantially in accordance with the equation:

$$S = F \cdot T = C \cdot m = \begin{bmatrix} 0.3536 & 0.3841 & 0.1353 & -0.0373 & 0 & 0.1877 & 0.3266 & 0.2566 \\ 0.3536 & 0.2566 & -0.1353 & -0.1877 & 0 & -0.0373 & -0.3266 & -0.3841 \\ 0.3536 & -0.2566 & -0.1353 & 0.1877 & 0 & 0.0373 & -0.3266 & 0.3841 \\ 0.3536 & -0.3841 & 0.1353 & 0.0373 & 0 & -0.1877 & 0.3266 & -0.2566 \end{bmatrix}$$

18. The apparatus of claim 17, wherein F is defined substantially in accordance with the equation:

$$F = \frac{1}{2} \cdot \begin{bmatrix} 1 & 0 & 1 & 0 & 0 & 0 & 0 & 0 \\ 0 & 1 & 0 & 1 & 0 & 0 & 0 & 0 \\ 0 & 0 & 0 & 0 & 1 & 0 & 1 & 0 \\ 0 & 0 & 0 & 0 & 0 & 1 & 0 & 1 \end{bmatrix}.$$

19. The apparatus of claim 17, wherein C and in are defined substantially in accordance with the equations:

$$C = \begin{bmatrix} 1 & 1 & 1 & c_0 & 0 & 1 & 1 & c_1 \\ 1 & c_1 & -1 & -1 & 0 & -c_0 & -1 & -1 \\ 1 & -c_1 & -1 & 1 & 0 & c_0 & -1 & 1 \\ 1 & -1 & 1 & c_0 & 0 & -1 & 1 & -c_1 \end{bmatrix}$$

where $c_0 = 0.1989$; $c_1 = 0.6682$; and
m=[0.3536 0.3841 0.1351 0.1877 0 0.1877 0.3266 0.3841].

20. The apparatus of claim 13, wherein:
said DCT coefficient blocks comprise 8×8 DCT coefficient blocks representing 8×8 interlaced 1920×1080 resolution frame-mode coded original pixel blocks;
said produced pixel blocks comprise 4×4 pixel blocks; and
said transform module effects a down-sample transform substantially in accordance with the equation:

$$S = F \cdot T =$$
$$C \cdot m = \begin{bmatrix} 0.3536 & 0.4902 & 0.1971 & -0.0033 & -0.0884 & -0.0553 & -0.0140 & 0.0363 \\ 0.3536 & 0 & -0.3943 & 0 & 0.1768 & 0 & -0.0280 & 0 \\ 0.3536 & -0.4902 & 0.1971 & 0.0033 & -0.0884 & 0.0553 & 0.0140 & -0.0363 \end{bmatrix}$$

21. The apparatus of claim 18, wherein F is defined substantially in accordance with the equation:

$$F = \frac{1}{2} \cdot \begin{bmatrix} 3/8 & 3/8 & 1/4 & 0 & 0 & 0 & 0 & 0 \\ 0 & 0 & 1/8 & 3/8 & 3/8 & 1/8 & 0 & 0 \\ 0 & 0 & 0 & 0 & 0 & 1/4 & 3/8 & 3/8 \end{bmatrix}.$$

22. The apparatus of claim 18, wherein C and m are defined substantially in accordance with the following equations:

$$C = \begin{bmatrix} 1 & 1 & 1/2 & -1 & -1/2 & -1 & 1/2 & 1 \\ 1 & 0 & -1 & 0 & 1 & 0 & -1 & 0 \\ 1 & -1 & 1/2 & 1 & -1/2 & 1 & 1/2 & -1 \end{bmatrix} ; \text{and}$$

m=[0.3536 0.4092 0.3943 0.0033 0.1768 0.0553 0.0280 0.0363].

* * * * *